US011009953B2

(12) United States Patent
Hashimoto et al.

(10) Patent No.: US 11,009,953 B2
(45) Date of Patent: May 18, 2021

(54) TACTILE SENSE PRESENTING DEVICE

(71) Applicant: Murata Manufacturing Co., Ltd., Nagaokakyo (JP)

(72) Inventors: Junichi Hashimoto, Nagaokakyo (JP); Kentaro Usui, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 70 days.

(21) Appl. No.: 15/434,540

(22) Filed: Feb. 16, 2017

(65) Prior Publication Data
US 2017/0160808 A1 Jun. 8, 2017

Related U.S. Application Data

(63) Continuation of application No. PCT/JP2015/072180, filed on Aug. 5, 2015.

(30) Foreign Application Priority Data

Aug. 22, 2014 (JP) .............................. JP2014-168911

(51) Int. Cl.
*G06F 3/01* (2006.01)
*G06F 3/02* (2006.01)
*G06F 3/0354* (2013.01)

(52) U.S. Cl.
CPC ............ *G06F 3/016* (2013.01); *G06F 3/0202* (2013.01); *G06F 3/03547* (2013.01); *G06F 2203/04809* (2013.01)

(58) Field of Classification Search
CPC .. G06F 3/016; G06F 3/03547; G06F 3/04809; G06F 3/0202; G06F 3/041
See application file for complete search history.

(56) References Cited

U.S. PATENT DOCUMENTS 6,018,210 A * 1/2000 Date ..................... H01L 41/042
310/311
9,707,593 B2 * 7/2017 Berte ..................... B06B 1/0603
(Continued)

FOREIGN PATENT DOCUMENTS

JP 2004-110800 A 4/2004
JP 2012-198582 A 10/2012
(Continued)

OTHER PUBLICATIONS

International Search Report issued in International Application No. PCT/JP2015/072180, dated Sep. 15, 2015.
(Continued)

*Primary Examiner* — Alexander Eisen
*Assistant Examiner* — Cory A Almeida
(74) *Attorney, Agent, or Firm* — Arent Fox LLP

(57) ABSTRACT

A resin film is disposed facing an upper surface of a diaphragm with a gap interposed therebetween. The gap is provided between a lower surface of the resin film and the upper surface of the diaphragm in a tactile feedback keyboard. Consequently, it is possible to secure a key stroke from the resin film to the upper surface of the diaphragm, and make a user feel a sense of an operation that the user has pushed a key. Further, the gap and the resin film reduces the vibrations from the diaphragm reaching an operation surface. Thus, the user feels the vibrations of the diaphragm via only a finger which has pushed the resin film until the resin film contacts the upper surface of the diaphragm, and the other fingers hardly feel the vibrations.

28 Claims, 10 Drawing Sheets

(56) References Cited

U.S. PATENT DOCUMENTS

| | | | |
|---|---|---|---|
| 2004/0047120 A1 | 3/2004 | Saiki et al. | |
| 2005/0253643 A1* | 11/2005 | Inokawa | G06F 3/016 327/517 |
| 2011/0090070 A1* | 4/2011 | Modarres | B06B 1/0622 340/407.2 |
| 2012/0194460 A1* | 8/2012 | Kuwabara | G06F 3/016 345/173 |
| 2014/0210601 A1 | 7/2014 | Sato et al. | |
| 2016/0023245 A1* | 1/2016 | Zadesky | A61B 5/7455 310/334 |

FOREIGN PATENT DOCUMENTS

| | | |
|---|---|---|
| JP | 2013-235614 A | 11/2013 |
| JP | 2013-250710 A | 12/2013 |
| JP | 2014-146296 A | 8/2014 |

OTHER PUBLICATIONS

Written Opinion of the International Searching Authority issued in International Application No. PCT/JP2015/072180, dated Sep. 15, 2015.

\* cited by examiner

TACTILE SENSE PRESENTING DEVICE

CROSS REFERENCE TO RELATED APPLICATIONS

The present application is a continuation of International application No. PCT/JP2015/072180, filed on Aug. 5, 2015, which claims priority to Japanese Patent Application No. 2014-168911, filed on Aug. 22, 2014, the entire contents of each of which are incorporated herein by reference.

TECHNICAL FIELD

The present invention relates to a touch input device which receives an input of a key when a touch operation is performed, and relates to a tactile feedback device which provides tactile vibratory feedback to the user when he or she performs a touch operation.

BACKGROUND ART

In recent years, tactile sense presenting keyboards which provide tactile vibratory feedback to a user so that the user knows he or she has pushed a key (has inputted a key) have been proposed.

For example, Japanese Patent Application Laid-Open No. 2013-250710 discloses a tactile sense presenting keyboard formed by laminating a display unit, a vibrating unit, a pressing force detecting unit and a touch sensor in the order. In this tactile sense presenting keyboard, the vibrating unit vibrates when a position of a touch operation detected by the touch sensor is a predetermined position, thereby providing a tactile feedback to a user.

However, the tactile sense presenting keyboard disclosed in the foregoing application is integrally formed by laminating the display unit, the vibrating unit, the pressing force detecting unit and the touch sensor, and therefore the user is substantially unable to press the touch sensor downwardly when he presses on the touch sensor. Therefore, the user does not feel like he or she has pushed a key.

Further, since the disclosed tactile feedback keyboard is formed by integrally forming each component, vibrations of the vibrating unit transmit to not only a position of a touch operation but also to the entire touch sensor. As a result, the user feels the vibration even in those fingers which are touching the touch sensor but have not performed the touch operation.

It is therefore an object of the present invention to provide a tactile sense presenting device whose operability is improved.

BRIEF DESCRIPTION OF THE INVENTION

A tactile feedback device in accordance with at least one aspect of the invention includes an elastic film having an operation surface which can be pressed against by a user of the tactile feedback device and a principal surface opposing the operation surface. The device further includes a vibrating body which vibrates in response to at least one drive signal applied thereto. The vibrating body has a principal surface which faces, and is spaced from, the principal surface of the elastic film so as to form a gap there between. A detector detects a touch operation on the operation surface of the elastic film and a driving signal generator applies the at least one drive signal to the vibrating body when the detector detects the touch operation.

The detector preferably comprises a plurality of touch sensors, each touch sensor detecting a touch operation on a respective portion of the operation surface of the elastic film. The vibrating body includes a flexible diaphragm and at least one piezoelectric unit which vibrates in response to the application of the at least one drive signal. The piezoelectric unit includes a piezoelectric film containing a piezoelectric resin and respective electrodes formed on opposing principal surfaces of the piezoelectric film.

The piezoelectric resin is preferably made from polyvinylidene fluoride or a chiral polymer. The chiral polymer is preferably polylactic acid.

In one preferred at least two piezoelectric units are provided. In such a case, the drive signal applied to at least one of the piezoelectric units is different than the drive signal applied to at least another of the piezoelectric units.

In a more preferred embodiment, three piezoelectric units are provided. Each such unit is elongated and has a longitudinal axis extending parallel to the other piezoelectric units. Again in this case, the drive signal applied to at least one of the piezoelectric units is different than the drive signal applied to at least another of the piezoelectric units.

The three piezoelectric units are first, second and third piezoelectric units and the driving signal generator applies first, second and third driving signals to the first, second and third piezoelectric units, respectively, the first and second driving signals being out of phase with the third driving signal.

In a preferred embodiment the first and second piezoelectric units are located on opposite sides of the third piezoelectric unit such that the third piezoelectric unit is sandwiched by the first and second piezoelectric units. The flexible diaphragm is preferably supported by a frame and each of the piezoelectric units has a first section (preferably a first end) coupled to the frame and a second section (preferably a second end) coupled to the flexible diaphragm.

The detector preferably includes a plurality of touch detectors, each corresponding to a respective key of the tactile feedback device. In such a case, the tactile feedback device may include a spacer having a plurality of openings, each opening corresponding to the location of a respective one of the keys, the spacer being located between the elastic film and the vibrating body.

The size of the openings and the thickness of the spacer are such that when a user presses the operation surface of the elastic film at a location corresponding to one of the keys by a sufficient amount, the elastic film moves toward and contacts the flexible diaphragm at a location corresponding to the location of the one of the keys and prevents the elastic film from contacting the vibrating body at other locations.

The spacer preferably includes a first set of parallel crosspieces and a second set of parallel crosspieces. The first set of crosspieces extending perpendicular to the second set of crosspieces. The spacer also preferably includes a plurality of downwardly extending leg portions each of which extends through a respective through hole formed in elastic film. The holes are sufficiently large that they do not prevent the elastic film from vibrating when the drive signal is applied to the vibrating body.

In a preferred embodiment, the flexible diaphragm moves toward and away from the elastic film when the drive signal is applied to the vibrating body. The vibrating body can be made of piezoelectric ceramics.

MODE FOR CARRYING OUT THE INVENTION

The tactile feedback keyboard 10 is preferably a touch keyboard which receives an input when the key on an operation surface is touched and preferably outputs a signal identifying the touched key to an external device (e.g. a PC) via an interface (e.g. a USB (Universal Serial Bus)). The tactile feedback keyboard 10 according to the disclosed embodiments makes a user feel that the user has pushed a key and transmits vibrations (presenting a tactile sense feedback) to only the finger touching the key, so that a sense of an operation improves.

Figure 1:
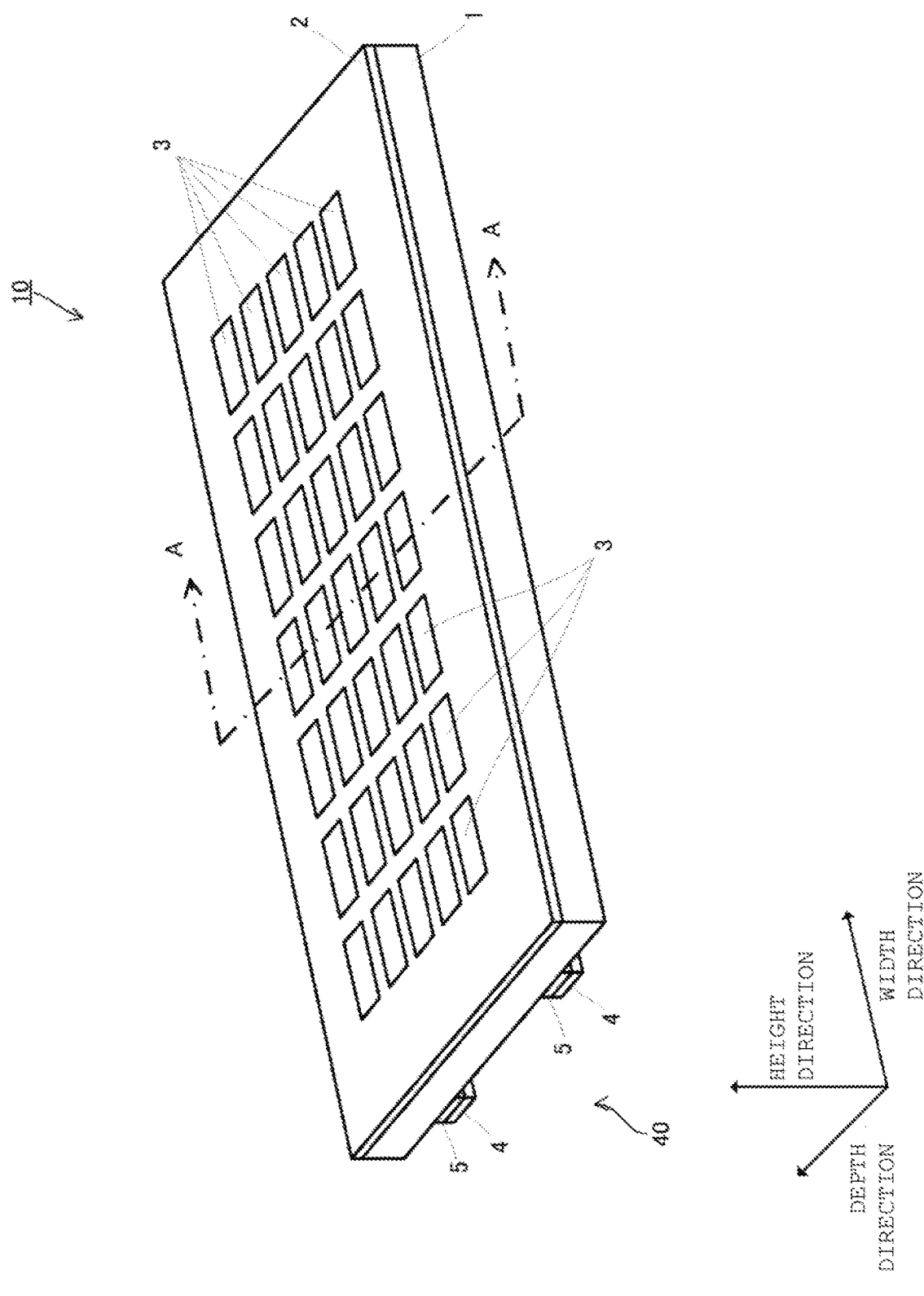
FIG. 1 is an external appearance perspective view of a tactile feedback keyboard in accordance with a first embodiment of the present invention.

As illustrated in FIG. 1, the tactile sense presenting keyboard 10 preferably has a shorter length (thickness) in a height direction than the width and depth directions, i.e., has a thin flat shape. The tactile feedback keyboard 10 preferably has the longer length in the width direction than in the depth direction.

Figure 2:
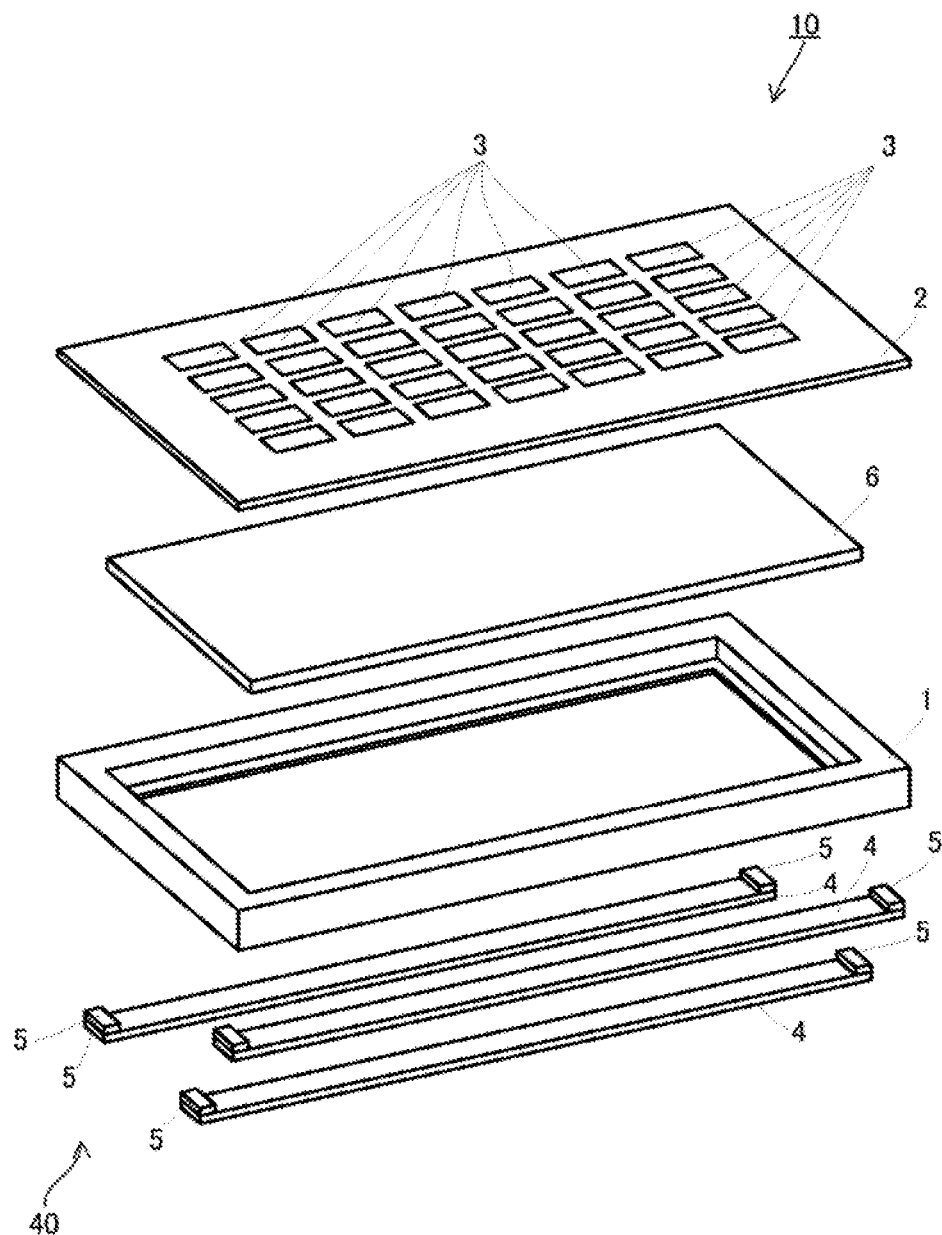
FIG. 2 is an exploded perspective view of the tactile feedback keyboard of FIG. 1.

As illustrated in FIGS. 1 and 2, the tactile sense presenting keyboard 10 of the first embodiment includes a frame body 1, an elastic resin film 2, a plurality of touch sensors 3 and a vibrating body 40. The frame body 1 preferably has the shorter length (thickness) in the height direction than in the depth direction and width directions. The frame body 1 has an opening which, as best shown in FIG. 3(A) receives a diaphragm 6.

Figure 3A:
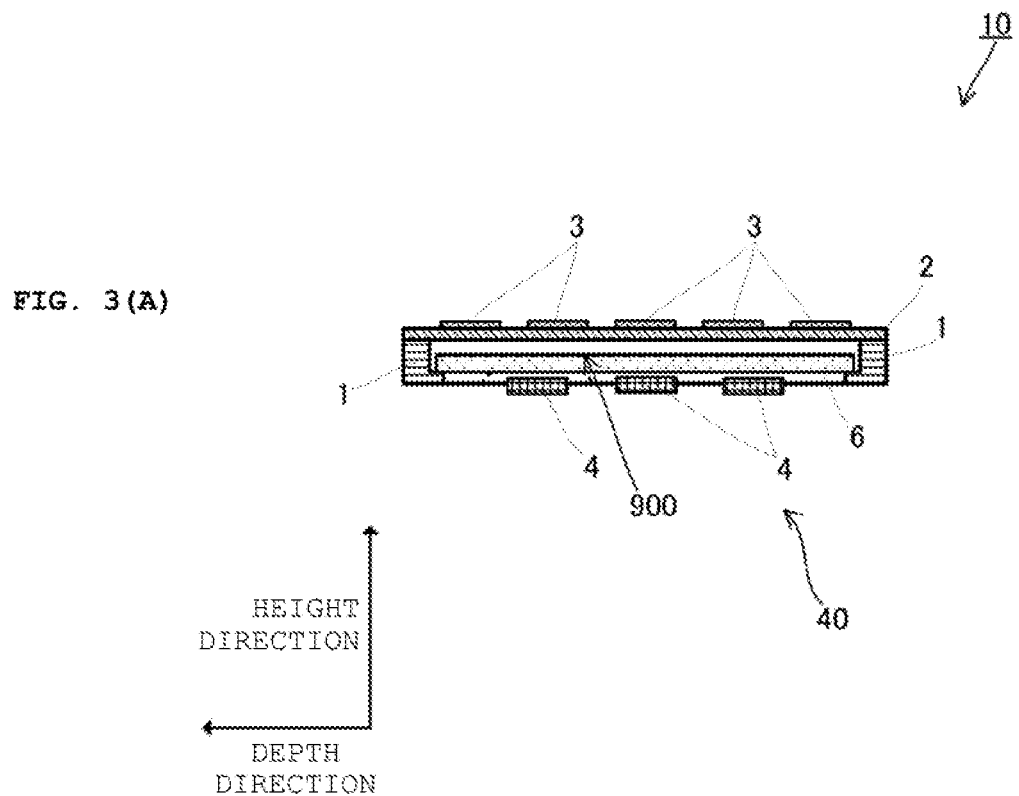
FIG. 3(A) is an A-A sectional view of the tactile feedback keyboard taken along lines 4(A) of FIG. 1.
Figure 4:
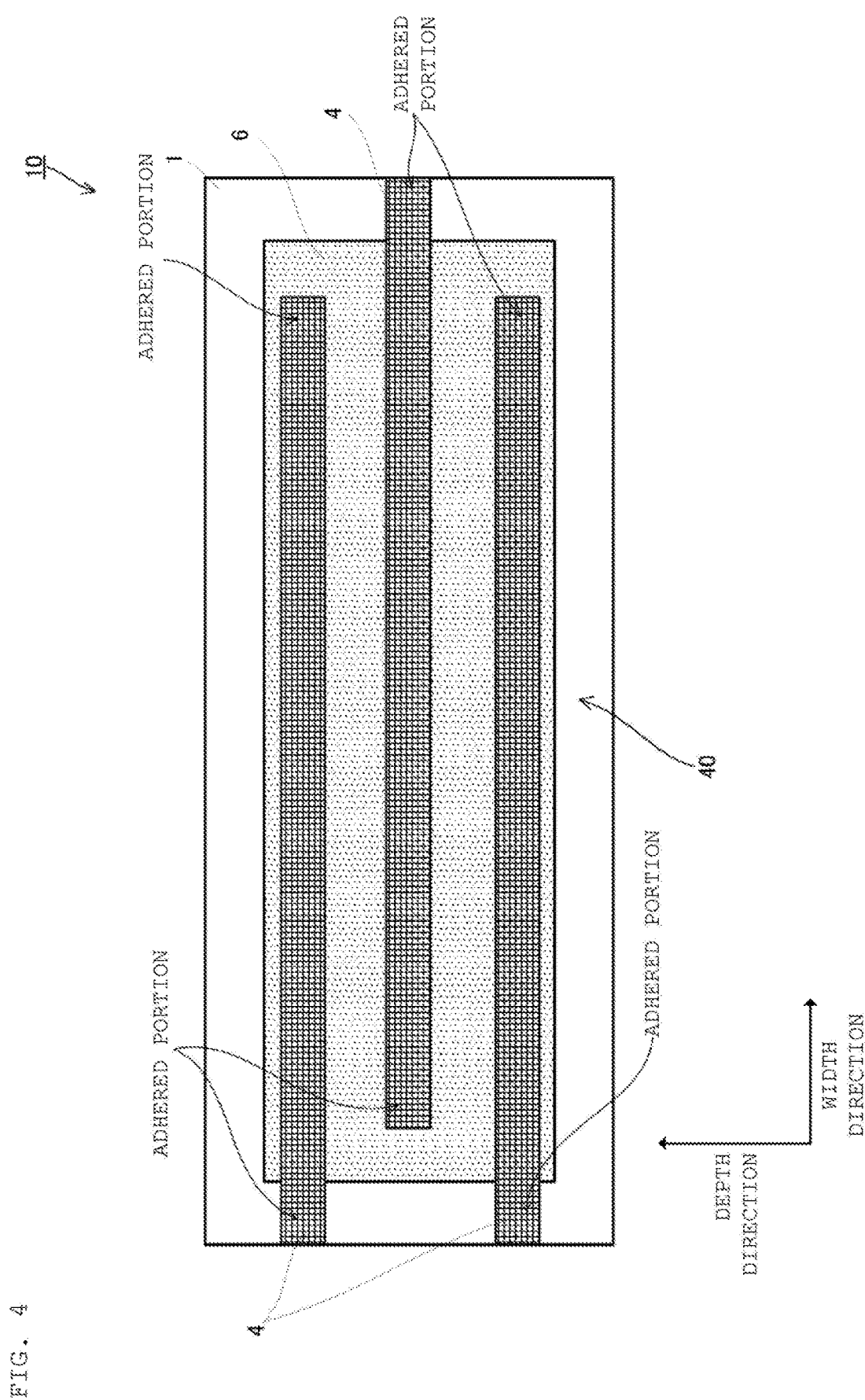
FIG. 4 is a back view of the tactile feedback keyboard of FIG. 1.

As illustrated in FIGS. 3(A) and 4, a lower surface of the diaphragm 6 is exposed through the opening portion in a lower surface of the frame body 1. The frame body 1 also holds a circuit module (not illustrated) for an electrical operation.

The opening portion in the upper surface of the frame body 1 is covered by the elastic resin film 2. An upper surface of the resin film 2 is an operation surface which a user touches. The resin film 2 is made of a silicone resin, for example. The thickness and a Young's modulus of the resin film 2 are preferably selected such that when the resin film 2 is attached to the upper surface of the frame body 1, the resin film 2 is not deformed by its own weight but can be pushed downwardly by the user's finger. The resin film 2 is not limited to a silicon resin and may be made of other materials such as polyethylene nano phthalate (PEN) and polyvinyl chloride (PVC).

The opening portion in the upper surface of the frame body 1 is covered by the resin film 2, so that as illustrated in FIG. 3(A), a gap 900 is formed between the resin film 2 and the diaphragm 6 (when the resin film 2 is not pushed downwardly by a user's finger). That is, the resin film 2 faces an upper surface of the diaphragm 6 with the gap 900 interposed therebetween. The thickness of the gap 900 is preferably uniform throughout as shown in FIG. 3(A). It should be noted that the thickness of the gap 900 in FIG. 3(A) is exaggerated. The actual thickness of the gap 900 is, for example, 0.1 mm to 1.0 mm, and is much smaller than the entire thickness of the tactile sense presenting keyboard 10. However, even with this very thin thickness, it is possible to make the user feel that he or she has pushed a key downwardly.

A plurality of touch sensors 3 are disposed on the upper surface of the resin film 2 at positions corresponding to the key alignment of the keyboard. The touch sensors 3 may be any type of a touch sensor as long as it has a function of detecting a user's touch operation. Various types of sensors such as a membrane type, a capacitive-type and a piezoelectric film type may be used. When touched by the user's finger, the touch sensor 3 outputs a signal to an extended wiring conductor (not illustrated) indicating that the sensor has been touched.

In a preferred embodiment, a cover (not shown) which covers both the resin film 2 and each touch sensor 3, and on which characters and symbols indicating the key alignment are formed, is disposed at an outermost layer above the resin film. However, the cover will not be described in the present embodiment.

As best shown in FIGS. 2, 3(A) and 4, the vibrating body 40 is composed of three piezoelectric films 4 and the diaphragm 6. The diaphragm 6 preferably has a flat (planar) shape and is made of, for example, acrylic resin PMMA. Other materials such as a metal plate (such as a stainless steel plate or a copper plate), PET, polycarbonate (PC), a glass epoxy resin plate and glass may also be used.

Figure 3B:
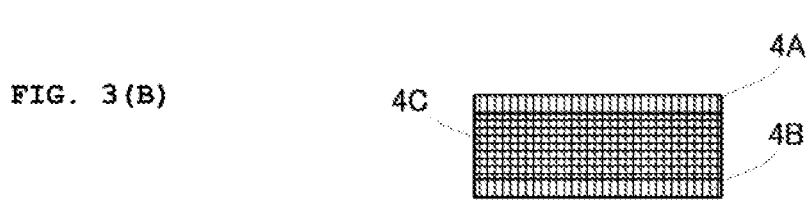
FIG. 3(B) is a view illustrating an enlarged cross section of a piezoelectric film of FIG. 3(A).
Figure 3B:
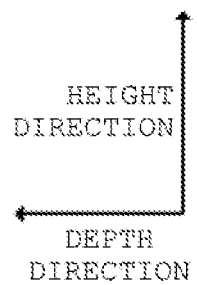

Each piezoelectric film 4 is elongated in the width direction 10 as illustrated in FIGS. 3(A) and 4. As illustrated in FIG. 3(B), electrodes 4A and 4B are formed on opposite principal surfaces of a base film 4C of each piezoelectric film 4. It is preferable to use aluminum deposited electrodes for the electrodes 4A and 4B. Main components of the electrode 4A and the electrode 4B are preferably indium tin oxide (ITO), zinc oxide (ZnO) and polythiophene when light-transmissiveness is necessary. Further, by using silver nanowire electrodes, it is possible to realize the electrode 4A and the electrode 4B having light-transmissiveness. The electrode 4A and the electrode 4B are connected with an extended wiring conductor, not illustrated, and drive signals are applied to the electrode 4A and the electrode 4B via the extended wiring conductor.

The base film 4C of each piezoelectric film 4 partially includes a resin of a piezoelectric material such as polyvinylidene fluoride (PVDF) or chiral polymers, for example. By using the PVDF as the material of the base film 4C, a piezoelectric constant becomes the high. By using polylactic acid (PLA) as the material of the base film 4C, the piezoelectric constant is high and light-transmissiveness is high. When the PLA is used as the material of the base film 4C, uniaxially stretched PLLA in particular is desirably used as the material. When the PLA is used, it is possible to realize the tactile sense presenting keyboard 10 whose almost all surfaces seen from the plan view have high light-transmissiveness by using a material having high light-transmissiveness for other components (the touch sensors 3, the diaphragm 6 and the electrodes 4A and 4B), too.

Further, piezoelectric characteristics of the chiral polymer 5 derive from a molecule structure, and, unlike ferroelectric polymer such as polyvinylidene fluoride, do not have a pyroelectric effect. Hence, the chiral polymer is suitable as a component such as the piezoelectric films 4 to which a temperature of the user's finger transmits.

When drive signals are applied to the electrodes 4A and 4B, the base film 4C stretches and contracts in a longitudinal direction (the width direction of the tactile feedback keyboard 10). When, for example, the material is the PLLA, the PLLA is cut such that a direction forming approximately 45° with respect to a stretching direction is the longitudinal direction in order to prepare the base film 4C which stretches and contracts in the longitudinal direction.

As best shown in FIG. 4, each piezoelectric film 4 preferably has one end adhered to the frame body 1 and the other end adhered to the lower surface of the diaphragm 6 (see the areas labelled "adhered portion" in FIG. 4). Each piezoelectric film 4 is preferably adhered to the frame 1 and the diaphragm 6 using respective clumps of adhesive 5 (FIG. 2). The adhesive is preferably applied to portions of the upper surface of the piezoelectric film that do not have electrodes formed thereon. That is, the adhesive is applied directly to the base film 5C. The three piezoelectric films 4 preferably extend in the width direction of the tactile feedback keyboard. They run parallel to one another and are spaced from one another in the debt direction of the keyboard.

More specifically, the center piezoelectric film 4 (as viewed in FIG. 4) has one end adhered to the right end portion of the lower surface of the frame body 1 and a second end adhered to the underside of the diaphragm 6, near the left edge thereof. The upper and lower piezoelectric films 4 have one end adhered to the left end portion of the frame body 1 and their other end adhered to the underside of the diaphragm 6 near the right side of the diaphragm 6. As a result, it is possible to use piezoelectric films 4 which are longer in the longitudinal direction and therefore to maximize the amount of stretching and contracting of each piezoelectric film 4. By using the piezoelectric films 4 as components, the vibrating body 40 is made to be thin compared to a case where a piezoelectric ceramic is used.

Each piezoelectric film 4 may be directly adhered to the frame body 1 and the diaphragm 6. Further, the plurality of piezoelectric films 4 may be aligned in the width direction. Alternatively, each piezoelectric film 4 may be adhered to the frame body 1 or the diaphragm 6 by being pasted on a principal surface of an exciter film made of a silicone resin and PET, and by the exciter film adhering to the frame body 1 or the diaphragm 6.

Still further, as illustrated in FIG. 4, by directly adhering the piezoelectric films 4 to the frame body, it is possible to use the stretching and contraction of substantially the entire length of the piezoelectric film 4. In an embodiment where an exciter film is adhered to the frame body 1 or the diaphragm 6 and the piezoelectric films are pasted on the exciter film, the shape of each piezoelectric film does not depend on the size of the frame body 1 and the diaphragm 6. Further, according to this mode, the piezoelectric films do not stretch and contract at portions at which the piezoelectric films are adhered to the frame body 1 or the diaphragm 6. Consequently, stretch and contraction of the piezoelectric films rarely causes an adhesion failure (peel).

The tactile feedback keyboard 10 is preferably provided with a cover which covers both the opening portion in the lower surface of the frame body 1 and each of the piezoelectric films 4, and a stand which adjusts an angle of the operation surface with respect to the user. However, these components will not be described in the present embodiment.

Figure 5:
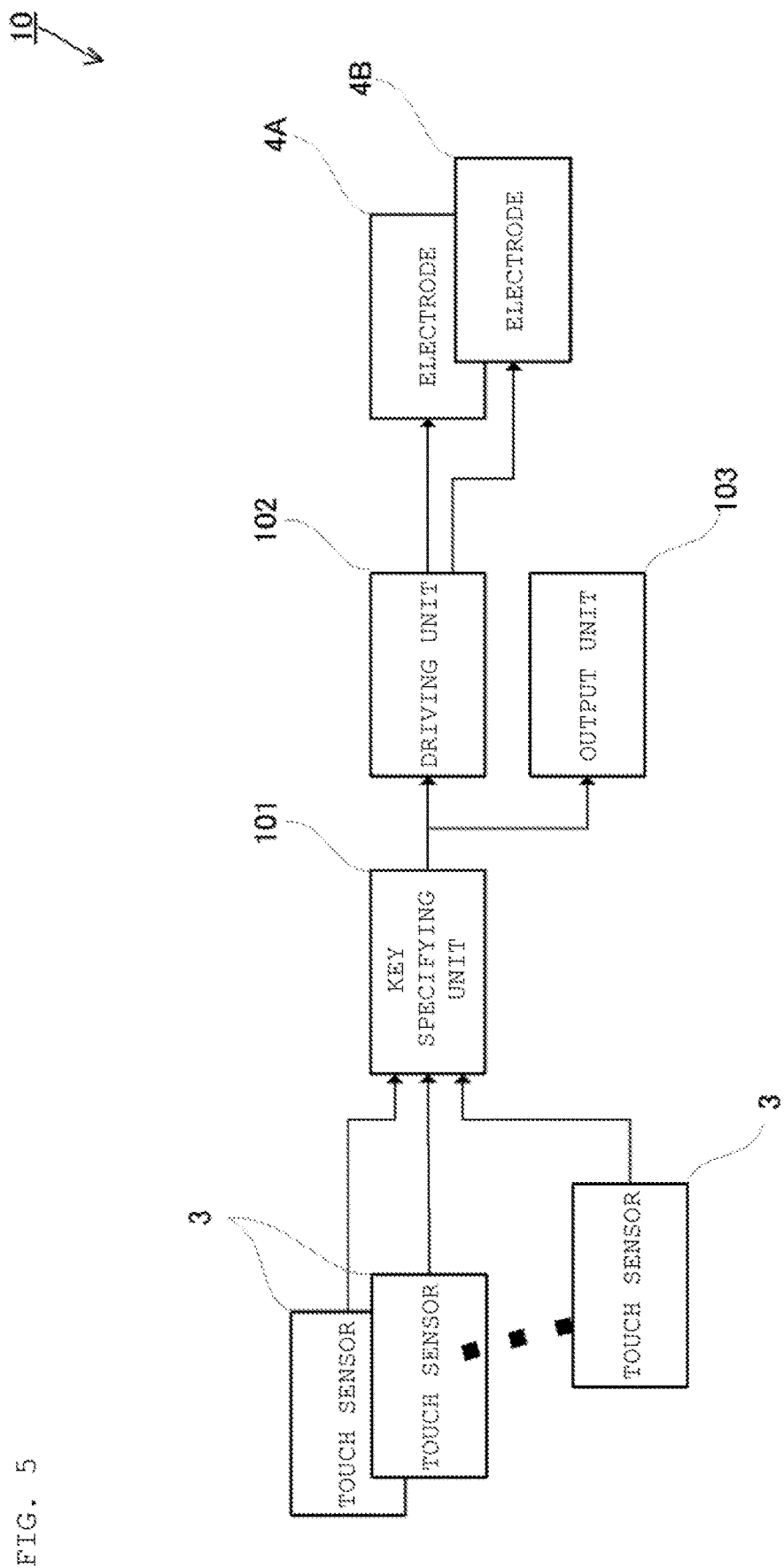
FIG. 5 is a block diagram illustrating part of a configuration of the tactile feedback keyboard of FIG. 1.

FIG. 5 is a block diagram illustrating a configuration of a circuit module (parts of which are located in the frame body 1) which controls the operation of the tactile feedback keyboard. The circuit module includes a key specifying unit 101, a driving unit 102 and an output unit 103.

The key specifying unit 101 stores information associating each touch sensor with a respective key position (i.e., the position of a respective touch sensor 3). The key specifying unit 101 obtains output signals from the plurality of touch sensors 3 and determines which touch sensor 3 has been touched by the user. The key specifying unit 101 then specifies a key (e.g. ENTER key) associated with the touch sensor 3 that has been touched.

The key specifying unit 101 outputs information identifying the touched key to the output unit 103. The output unit 103 transmits the obtained information identifying the touched key in a predetermined format to an external device according to a predetermined protocol via an interface.

Further, when specifying the key which has been touched, the key specifying unit 101 outputs information indicating that the key has been specified to the driving unit 102. When obtaining the information indicating that the key has been specified (and therefore touched), the driving unit 102 applies alternating-current drive voltages to the electrodes formed on opposite principal surfaces of each piezoelectric film 4. As a result, a touch on the touch sensor 3 triggers the driving unit 102 to output the drive voltages.

Figure 6:
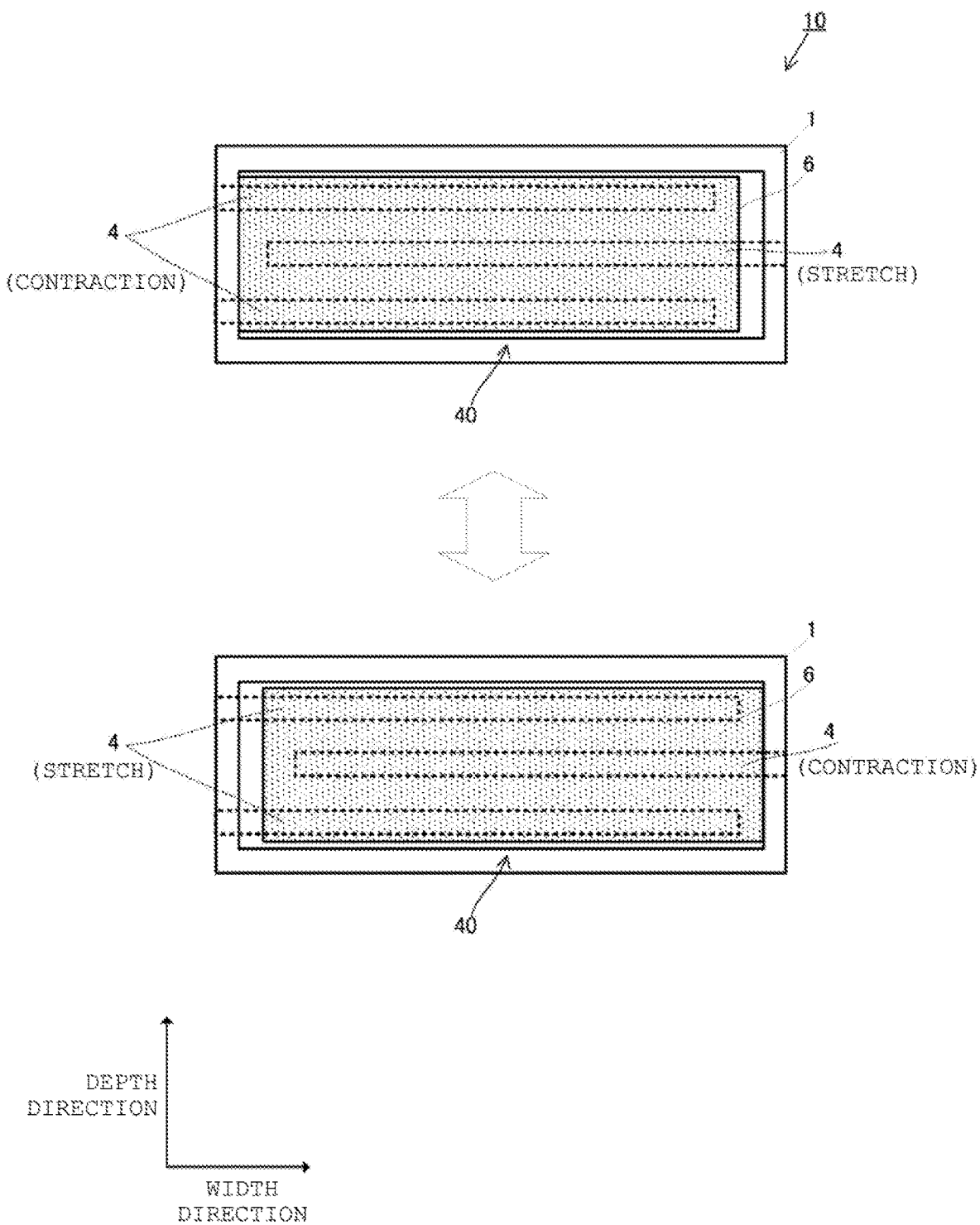
FIG. 6 is a schematic plan view of the tactical feedback keyboard of FIG. 1 used to explain vibrations of a diaphragm forming part of the tactile feedback keyboard.

Then, each piezoelectric film 4 repeatedly stretches and contracts in the longitudinal direction according to a cycle of the alternating-current drive voltage. The driving unit 102 outputs alternating-current drive voltages of reverse phases to the center piezoelectric film 4 in the depth direction on the one hand and the two outer piezoelectric films 4 (the piezoelectric films 4 disposed sandwiching the center piezoelectric film 4) on the other. Thus, as illustrated in FIG. 6, the center piezoelectric film 4 on the one hand and the two outer piezoelectric films 4 on the other contract and expand in opposite phase. As a result, the diaphragm 6 makes reciprocating movement (vibrates) along the width direction according to the cycles of the alternating-current voltages outputted from the driving unit 102. Because the piezoelectric films are vibrating in opposite phase, the user perceives the vibration as a vibration in the height direction. It should be noted that FIG. 6 illustrates an exaggerated movement amount of the diaphragm 6.

Figure 7:
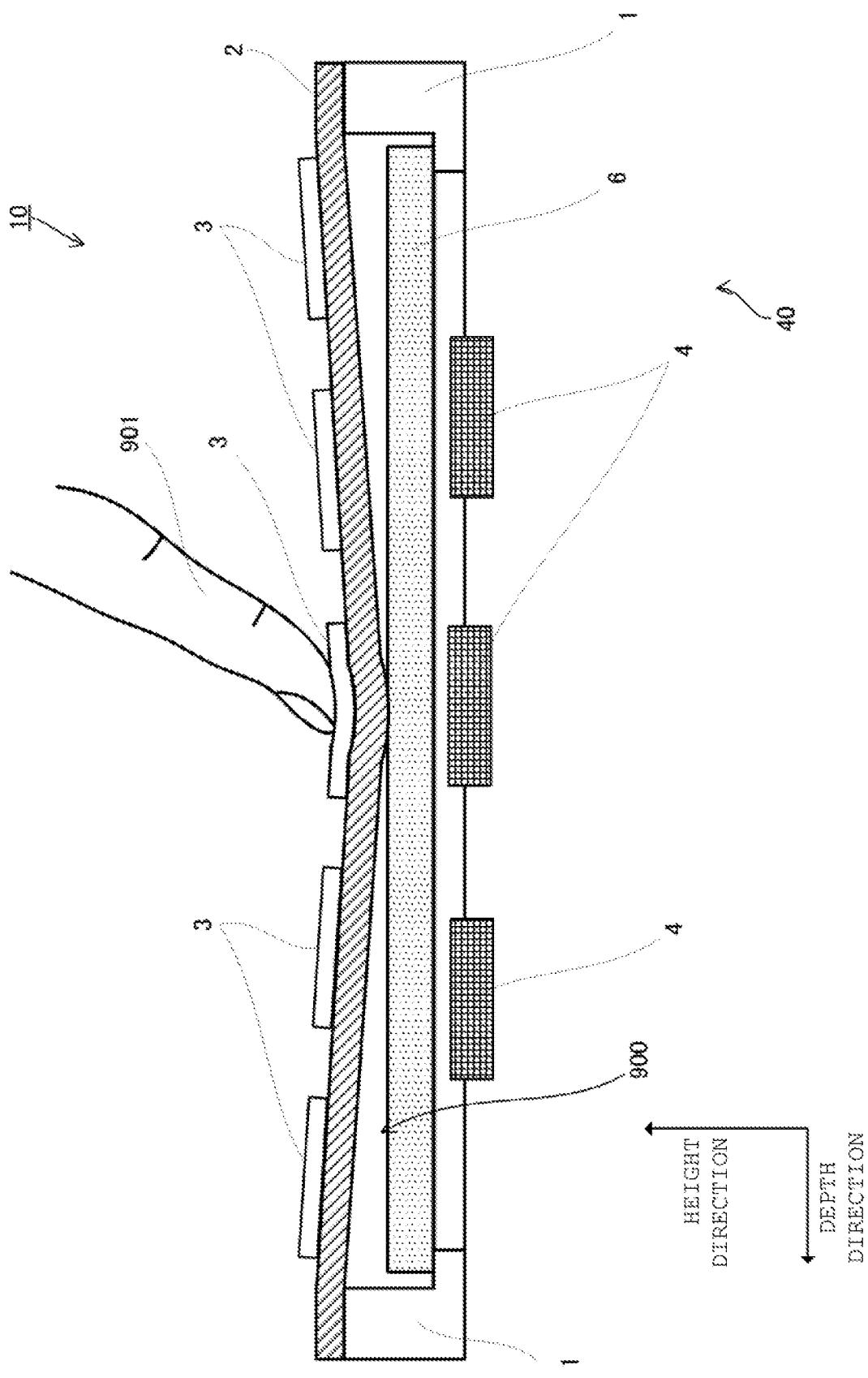
FIG. 7 is a cross sectional view of the tactile feedback keyboard showing an exemplary operation of the tactile feedback keyboard.

Next, FIG. 7 is cross-sectional view of the tactile feedback keyboard showing an exemplary operation of the tactile feedback keyboard 10. First, when a finger 901 of the user touches the touch sensor 3, the touched key is specified and the diaphragm 6 is vibrated in the width direction of the tactile feedback keyboard 10. As the user's finger pushes downwardly on the touch sensor 3, the resin film 2 is deformed toward the lower surface at a position of the touched touch sensor 3. When the user pushes the touch sensor 3 further, the downwardly protruding portion of the lower surface of the resin film 2 contacts the upper surface of the diaphragm 6 as illustrated in FIG. 7. Then, the user feels the vibration of the diaphragm 6 via his or her finger 901.

The tactile feedback keyboard 10 includes the gap 900 between the piezoelectric film 2 and the diaphragm 6, and, consequently, allows a downward key stroke of the resin film by a distance corresponding to the gap 900, thereby allowing the user to feel like he or she has pushed (depressed) a key.

Further, the piezoelectric film 2 restores to its original shape by elasticity when the user moves his or her finger 901 away from the key. Consequently, the tactile feedback keyboard 10 can also make the user feel that the user has moved his or her finger away from the key (that is, has finished inputting the keys stroke).

Further, the vibrations from the diaphragm 6 are buffered by the gap 900 and the resin film 2 and are therefore minimally transmitted to the operation surface. Thus, the user feels the vibration of the diaphragm 6 via only the finger 901 which has depressed the resin film 2 until the resin film 2 contacts the principal surface of the diaphragm 6. His or her other fingers barely feel the vibrations.

As described above, the tactile sense presenting keyboard 10 according to the present embodiment provides the user with the feeling that he or she has depressed the key and minimizes the transmission of the tactile feedback vibrations any of the user's fingers other than the finger which pushed down on the resin film 2, so that it is possible to improve the perception of an operation.

In the embodiment shown in FIG. 7, each touch sensor 3 is located on the upper surface of the resin film 2. However, they may be located elsewhere, for example on the lower surface of the resin film 2.

The tactile sense presenting keyboard 10 causes the vibrating body 40 to start vibrating before the user's finger 901 holds down the diaphragm 6 with the resin film 2 interposed therebetween when each touch sensor 3 is disposed at the side of the operation surface (e.g. the lower surface of the resin film 2) from the diaphragm 6 with the gap 900 interposed therebetween. Consequently, the vibrating body 40 is not prevented from vibrating when it is held down by the user's finger 901.

Further, the tactile feedback keyboard 10 may include the touch panel and may detect a position at which a touch operation has been performed, specify a key associated with the detected position of the touch operation and cause the vibrating body 40 to vibrate.

Figure 8:
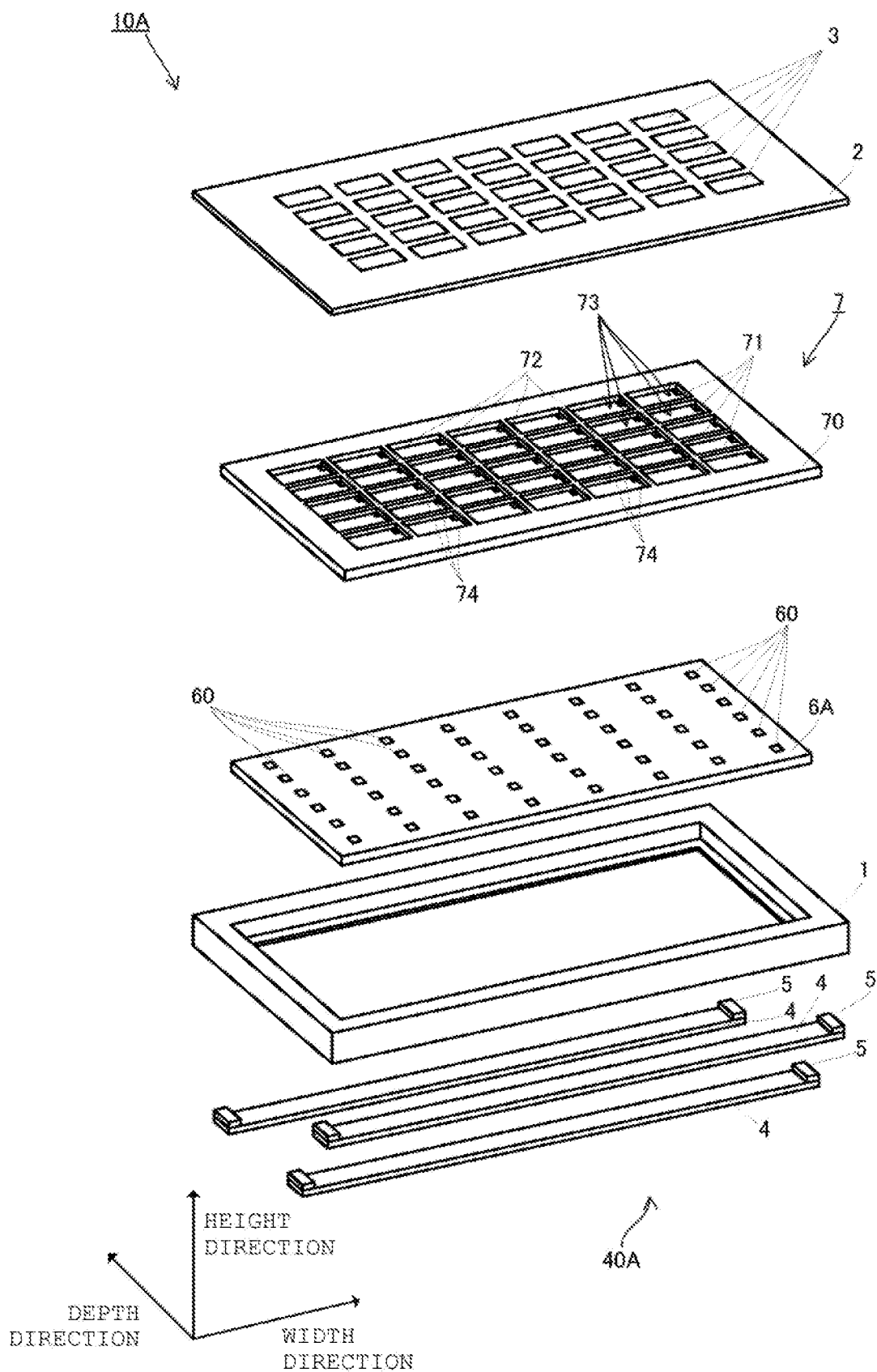
FIG. 8 is an exploded perspective view of a second embodiment of a tactile feedback keyboard.

Next, a tactile sense presenting keyboard 10A according to a second embodiment will be described with reference to FIG. 8. FIG. 8 is an exploded perspective view of the tactile feedback keyboard 10A. The tactile feedback keyboard 10A differs from the tactile feedback keyboard 10 of the first embodiment by preventing a resin film 2 from deforming downwardly toward a lower surface side in an area other than an area of a pushed touch sensor 3.

More specifically, the tactile feedback keyboard 10A differs from the tactile feedback keyboard 10 in that it includes a spacer 7 and the diaphragm 6A has holes 60 formed therein. The spacer 7 is located in the gap 900 between the resin film 2 and the diaphragm 6 of the tactile sense presenting keyboard 10 according to the first embodiment. As illustrated in FIG. 8, the spacer 7 includes a plurality of first and second crosspieces 71 and 72 which cooperate to define respective open areas 73, each of which corresponds to the location of respective touch sensor 3. That is, the tactile feedback keyboard 10A is configured such that, when seen from a plan view, the first and second crosspieces 71 and 72 partition the plurality of touch sensors 3 from one another, and each open area 73 overlaps a respective touch sensor 3.

The spacer 7 preferably includes a plurality of downwardly extending leg portions 74, each located where respective first and second crosspieces 71 and 72 meet. A plurality of holes 60 are formed in the diaphragm 6A. Each hole 60 is disposed at a position corresponding to a respective leg portion 74. The shape of each hole 60 is set by taking into account the expected amount of movement of the diaphragm 6A. Each leg portion 74 penetrates through a corresponding hole 60 even when moving downwardly toward the lower surface side, and therefore does not contact the diaphragm 6A even when the diaphragm 6A vibrates. Thus, the leg portions 74 do not prevent the diaphragm 6A from vibrating. Further, when penetrating through each hole 60, each leg portion 74 contacts a cover (not shown) which covers a lower surface of the diaphragm 6A and prevents the first and second crosspieces 71 and 72 from moving downwardly toward the lower surface side too much.

The size and location of the open areas 73 allow the portion of the resin film 2 corresponding to the touch sensor 3 which has been depressed by the user's finger to move downwardly but prevents the other portions of the resin film 2 corresponding to other touch sensors from moving downward by any significant amount.

In the above example, the vibrating body 40A vibrates (contracts and expands) in the width direction of the tactile sense presenting keyboard 10. However, in the embodiment of FIGS. 9(A) and 9(B), they vibrate in the height direction.

Figure 9A:
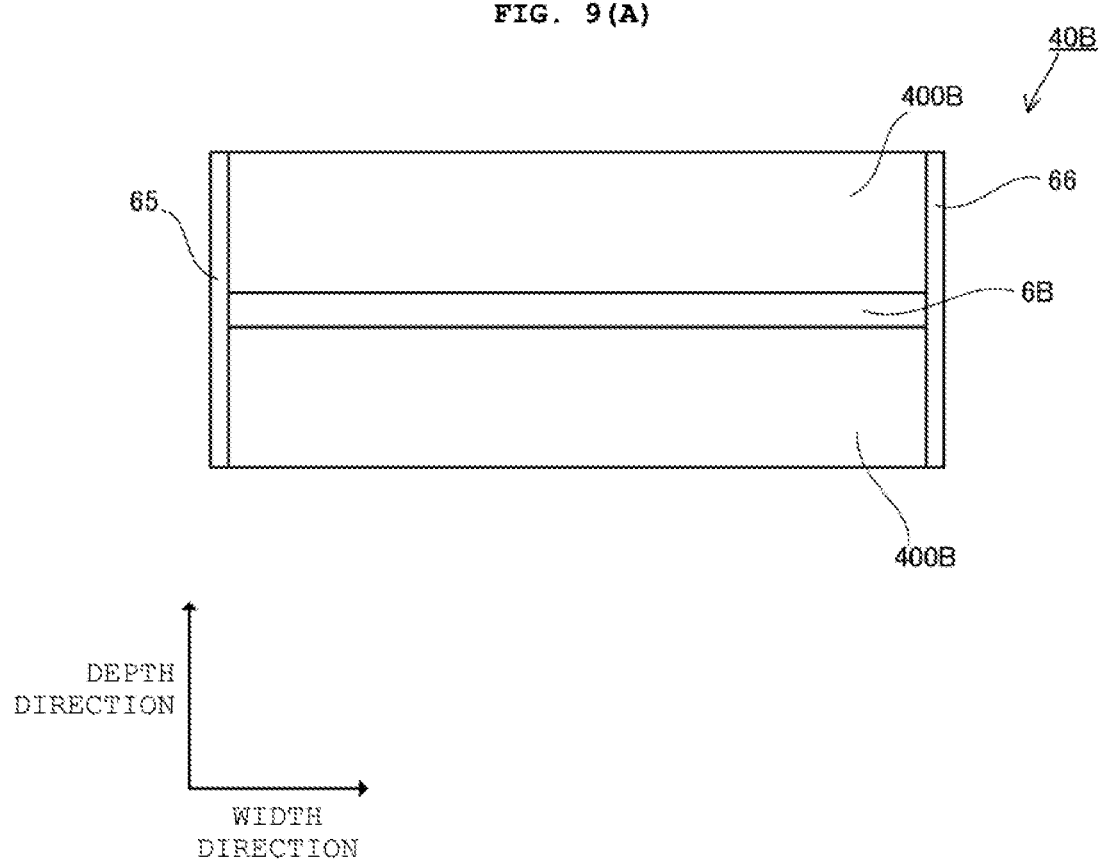
FIG. 9(A) is a back view of a vibrating body forming part of the tactile feedback keyboard of FIG. 8.
Figure 9B:
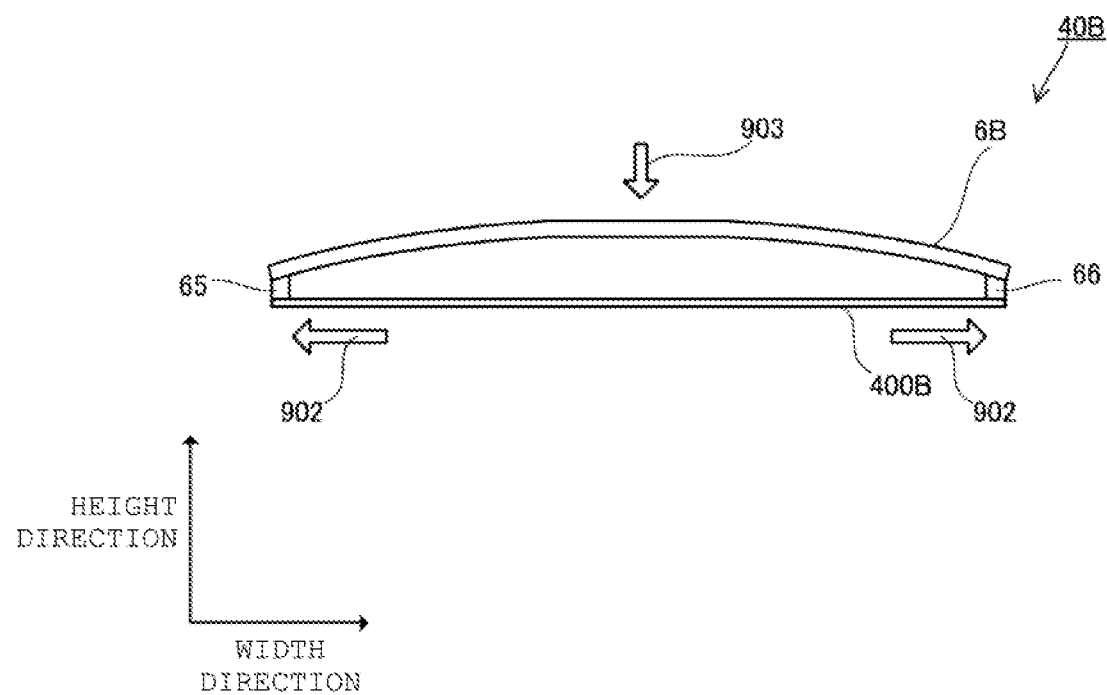
FIG. 9(B) is a side view of the vibrating body of FIG. 9(a) seen along a depth direction.

FIG. 9(A) is a bottom view of a vibrating body 40B according to a modified example of the vibrating body 40 according to the first embodiment. FIG. 9(B) is a side view of the vibrating body 40B seen along a depth direction. In this regard, FIGS. 9(A) and 9(B) do not illustrate components other than the vibrating body 40B for ease of description. Further, FIG. 9(B) illustrates an exaggerated warping amount of a diaphragm 6B in a height direction, but an actual warping amount of the diaphragm 6B cannot be visually perceived by a person via a finger 901.

As illustrated in FIG. 9(A), the vibrating body 40B includes the diaphragm 6B, two piezoelectric films 400B and two frame members 65 and 66. As illustrated in FIG. 9(B), the diaphragm 6B differs from the diaphragm 6 in that a center portion in the width direction warps in a height direction.

The two piezoelectric films 400B differ from the piezoelectric films 4 in their shape and the way they are adhered to the diaphragm 6B. Each piezoelectric film 400B has the substantially same length as the length of the diaphragm 6B in the width direction of the tactile feedback keyboard 10. As illustrated in FIG. 9(A), the two piezoelectric films 400B are disposed in order along the depth direction of the tactile feedback keyboard 10. Each piezoelectric film 400B has its opposite end portions adhered to a respective end portion of the diaphragm 6B via a respective one of the frame members 65, 66. More specifically, as best shown in FIG. 9(B), the end portions of each piezoelectric film 400B in the width direction are coupled to the respective end portions of the diaphragm 6B in the width direction with the frame members 65 and 66 interposed therebetween.

When the piezoelectric films 400B stretch along the width direction as indicated by arrows 902 in FIG. 9(B), a center portion of the diaphragm 6B in the width direction is displaced in the negative height direction (i.e., downwardly in the figure) as indicated by an arrow 903. When the piezoelectric films 400B contract along the width direction, the center portion of the diaphragm 6B in the width direction is displaced in the positive height direction (i.e., upwardly in the figure). Hence, as the piezoelectric film 400B stretches and contracts, the center portion of the diaphragm 6B repeatedly raises and lowers. Thus, the diaphragm 6B vibrates along the height direction about the center portion of the diaphragm 6B in the width direction.

In this regard, when the diaphragm 6B and piezoelectric films 400B are adhered to one another, bending stresses in the negative height direction (i.e., the downward direction) are desirably applied to end portions of the diaphragm 6B in the width direction and in the negative width direction. Thus, a tensile force which stretches each piezoelectric film 400B in the width direction is applied to each piezoelectric film 400B. This tensile force enhances a stretching force of the piezoelectric films 400B in the width direction, and causes the diaphragm 6B to vibrate more greatly.

Further, the vibrating body 40B can vibrate the diaphragm 6B at two different frequencies by applying drive signals of different frequencies to the respective piezoelectric films 400B. Consequently, the tactile feedback keyboard 10 enables the user to perceive various vibrations when a key is pushed. The vibrating body 40B is not limited to two piezoelectric films 400B, and, for example, may include one piezoelectric film whose principal surface has substantially the same shape as that of the diaphragm 6B.

Figure 10:
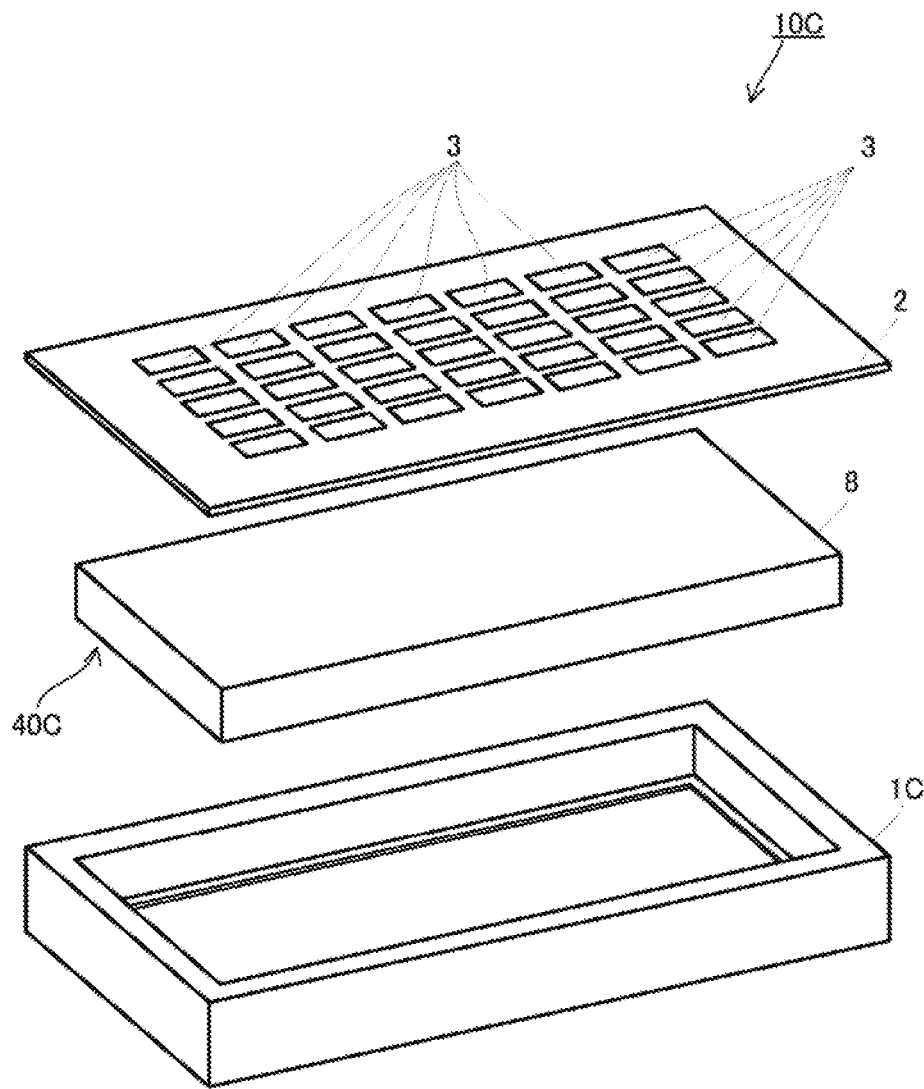
FIG. 10 is an exploded perspective view of a tactile feedback keyboard in accordance with a third embodiment of the present invention.

In the above examples, the vibrating bodies 40, 40A and 40B are preferably composed of the piezoelectric films 4. However, other types of vibrating bodies can be used. As illustrated in, for example, the exploded perspective view in FIG. 10, a vibrating body 40C may be composed of a piezoelectric ceramics 8.

The piezoelectric ceramics 8 preferably has a flat shape and is held by a hollow portion of a frame body 1C. Electrodes (not illustrated) are formed on opposing principal surfaces of the piezoelectric ceramics 8. When an electric field is produced between both the principal surfaces by drive signals to be applied to the electrodes, the piezoelectric ceramics 8 vibrates while repeating expanding and contracting in a thickness direction of the tactile sense presenting keyboard 10C. The vibrating body 40C is not limited to the piezoelectric ceramics 8 and may, for example, be composed of a vibrator including an electric motor.

Further, the above example is a keyboard. However, the tactile feedback device according to the present invention may be, for example, game pads as long as the tactile sense presenting devices present tactile senses in response to touch operations.

The invention claimed is:

1. A tactile feedback device comprising:
    a film having first and second opposed principal surfaces, the first principal surface being an operation surface which can be pressed against by a user of the tactile feedback device;
    a frame defining an enclosed area, the frame having first and second opposed sides which are spaced from one another;
    a flexible diaphragm which is planar in shape and is supported by the frame in such a manner that a contiguous, unsupported portion of the flexible diaphragm extends over the enclosed area, the flexible diaphragm having first and second opposed principal surfaces, the first principal surface of the flexible diaphragm facing, and being spaced from, the second principal surface of the film so as to form a gap there between;
    first and second piezoelectric vibrators, each having first and second opposed principal surfaces, the first principal surface of each of the piezoelectric vibrators facing the second principal surface of the flexible diaphragm, the first piezoelectric vibrator being coupled to the first side of the frame at a position outside of the enclosed area, extending over the unsupported portion of the flexible diaphragm, and being adhered to the unsupported portion of the flexible diaphragm, the second piezoelectric vibrator being coupled to the second side of the frame at a position outside of the enclosed area, extending over the unsupported portion of the flexible diaphragm, and being adhered to the unsupported portion of the flexible diaphragm, at least part of the first and second piezoelectric vibrators which extend over the unsupported portion of the flexible diaphragm comprising a piezoelectric material;
    a detector which detects a touch operation on the operation surface of the film; and
    a driving signal generator which, when the detector detects the touch operation, applies one or more drive signals to the piezoelectric vibrators so as to cause the piezoelectric vibrators, and with them the flexible diaphragm, to vibrate.

2. The tactile feedback device according to claim 1, wherein the detector comprises a plurality of touch sensors, each touch sensor detecting a touch operation on a respective portion of the operation surface of the film.

3. The tactile feedback device according to claim 1, wherein each of the piezoelectric vibrators has a respective first end coupled to the frame and a respective second end coupled to the unsupported portion of the flexible diaphragm.

4. The tactile feedback device according to claim 1, wherein the detector includes a plurality of touch detectors, each corresponding to a respective key of the tactile feedback device, the tactile feedback device further comprising a spacer having a plurality of openings, each opening corresponding to the location of a respective one of the keys, the spacer being located between the film and the flexible diaphragm.

5. The tactile feedback device according to claim 4, wherein the size of the openings and the thickness of the spacer are such that when a user presses the operation surface of the film at a location corresponding to one of the keys by a sufficient amount, the film moves toward and contacts the flexible diaphragm at a location corresponding to the location of the one of the keys and prevents the film from contacting the flexible diaphragm at other locations.

6. The tactile feedback device according to claim 5, wherein the spacer includes a first set of parallel crosspieces and a second set of parallel crosspieces, the first set of crosspieces extending perpendicular to the second set of parallel crosspieces.

7. The tactile feedback device according to claim 6, wherein the spacer includes a plurality of downwardly extending leg portions each of which extends through a respective through hole formed in flexible diaphragm.

8. The tactile feedback device according to claim 7, wherein the through holes are sufficiently large that they do not prevent the diaphragm from vibrating when the drive signals are applied to the piezoelectric vibrators.

9. The tactile feedback device according to claim 7, wherein the flexible diaphragm moves toward and away from the film when the drive signals are applied to the piezoelectric vibrators.

10. The tactile feedback device according to claim 1, wherein the piezoelectric vibrators comprise piezoelectric ceramics.

11. The tactile feedback device according to claim 1, wherein the first principal surface of each of the piezoelectric vibrators is spaced from the second principal surface of the flexible diaphragm with an air gap there between.

12. The tactile feedback device according to claim 1, wherein:
the flexible diaphragm lies in a plane;
the frame includes a protruding portion that extends parallel to the plane of the flexible diaphragm; and
the flexible diaphragm and the piezoelectric vibrators are attached to the protruding portion.

13. The tactile feedback device according to claim 12, wherein:
the protruding portion has first and second opposed surfaces;
the flexible diaphragm is attached to the first surface of the protruding portion; and
the piezoelectric films are attached to the second surface of the protruding portion.

14. The tactile feedback device according to claim 1, wherein each of the first and second piezoelectric vibrators comprises a respective piezoelectric film containing a piezoelectric resin and respective electrodes formed on opposed principal surfaces of the respective piezoelectric film.

15. The tactile feedback device according to claim 14, wherein the piezoelectric resin comprises polyvinylidene fluoride.

16. The tactile feedback device according to claim 14, wherein the piezoelectric resin comprises chiral polymer.

17. The tactile feedback device according to claim 16, wherein the chiral polymer is polylactic acid.

18. The tactile feedback device according to claim 1, wherein:
the drive signal generator generates a first drive signal which is applied to the first piezoelectric vibrator and a second drive signal which is applied to the second piezoelectric vibrator, the second drive signal being different than the first drive signal.

19. The tactile feedback device according to claim 1, wherein:
the tactile feedback device further comprises a third piezoelectric vibrator having a principal surface which faces the second principal surface of the flexible diaphragm, the principal surface of the third piezoelectric vibrator being coupled to both the unsupported portion of the flexible diaphragm and the first side of the frame;
the driving signal generator applying drive signals to the first, second and third piezoelectric vibrators, respectively, in response to the detector detecting the touch operation, so as to cause the first, second and third piezoelectric vibrators, and with them the flexible diaphragm, to vibrate; and
each of the first, second and third piezoelectric vibrators being elongated and having a respective longitudinal axis, the longitudinal axis of the first, second and third piezoelectric vibrators being parallel to one another.

20. The tactile feedback device according to claim 19, wherein the first and third piezoelectric vibrators are located on opposite sides of the second piezoelectric vibrator such that the second piezoelectric vibrator is sandwiched by the first and third piezoelectric vibrators.

21. The tactile feedback device according to claim 19, wherein the drive signals applied to the first, second and third piezoelectric vibrators are different from one another.

22. The tactile feedback device according to claim 21, wherein the drive signals applied to the first, second and third piezoelectric vibrators are out of phase with one another.

23. The tactile feedback device according to claim 1, wherein the piezoelectric vibrators are coupled to the frame without the flexible diaphragm being interposed there between.

24. The tactile feedback device according to claim 1, wherein:
the frame is rectangular in shape and has a width and a length direction, a length of the frame as measured along the width direction the length being longer than a width direction of the frame as measured along the width direction;
the first and second piezoelectric vibrators are elongated in the length direction of the frame.

25. The tactile feedback device according to claim 24 wherein:
the first and second opposed sides of the frame extend in the width direction of the frame;
the first piezoelectric vibrator is attached to the first opposed side of the frame; and
the second piezoelectric vibrator is attached to the second opposed side of the frame.

26. The tactile feedback device according to claim 1, wherein the drive signal applied to the first piezoelectric vibrator is out of phase with the drive signal applied to the second piezoelectric vibrator.

27. The tactile feedback device according to claim 1, wherein the frame has a length direction and a width direction and the first and second piezoelectric vibrators overlap one another in the length direction of the frame.

28. The tactile feedback device according to claim 27, wherein:
the first piezoelectric vibrator extends from the first opposed side of the frame toward the second opposed side of the frame; and
the second piezoelectric vibrator extends from the second opposed side of the frame toward the first opposed side of the frame.

* * * * *